Dec. 18, 1962 C. MEWSE 3,068,737
BALL DETENT COUPLING DEVICE WITH A ROTATABLE
AND AXIALLY MOVABLE OPERATING MEMBER
Filed Aug. 3, 1959 3 Sheets-Sheet 1

Inventor
Charles Mewse
By Kenyon, Palmer,
Stuart + Estabrook

Dec. 18, 1962
C. MEWSE
3,068,737
BALL DETENT COUPLING DEVICE WITH A ROTATABLE
AND AXIALLY MOVABLE OPERATING MEMBER
Filed Aug. 3, 1959
3 Sheets-Sheet 2
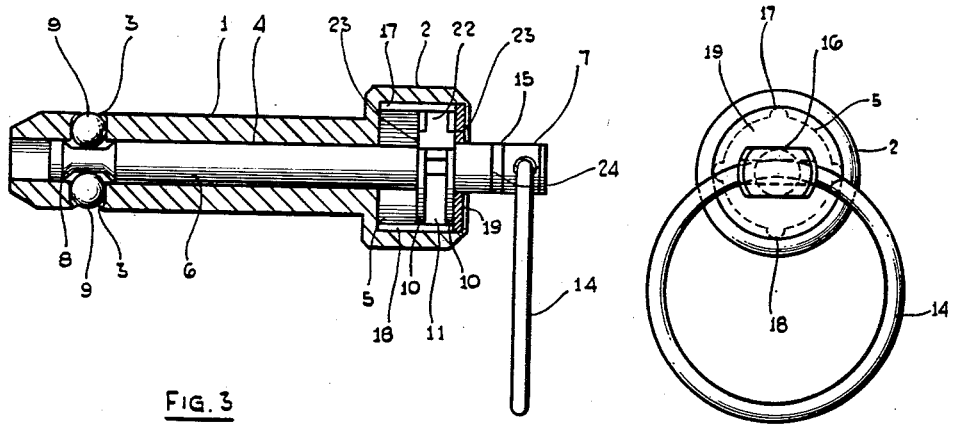
FIG. 3
FIG. 4
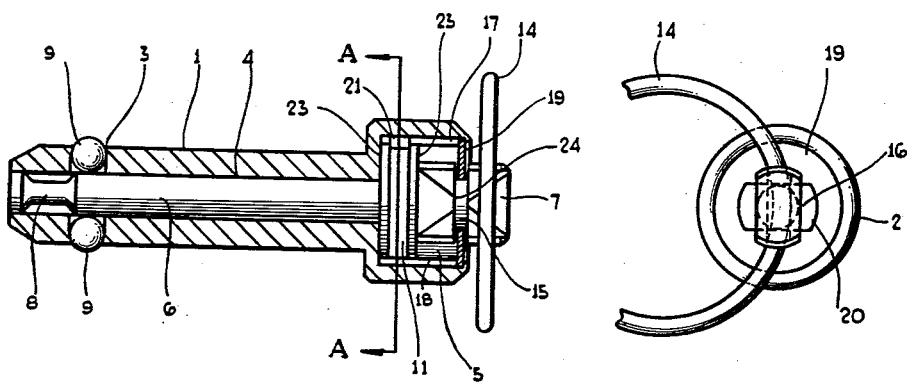
FIG. 5
FIG. 6
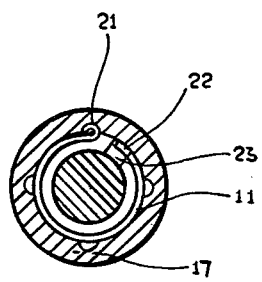
FIG. 7
Inventor
Charles Mewse
By Kenyon, Palmer,
Stewart & Estabrook Dec. 18, 1962 C. MEWSE 3,068,737
BALL DETENT COUPLING DEVICE WITH A ROTATABLE
AND AXIALLY MOVABLE OPERATING MEMBER
Filed Aug. 3, 1959 3 Sheets-Sheet 3

Inventor
Charles Mewse
By Kenyon, Palmer,
Stewart & Estabrook

United States Patent Office 3,068,737
Patented Dec. 18, 1962

3,068,737
BALL DETENT COUPLING DEVICE WITH A ROTATABLE AND AXIALLY MOVABLE OPERATING MEMBER
Charles Mewse, Welwyn Garden City, England, assignor to Avdel Limited, Welwyn Garden City, England, an English joint-stock company
Filed Aug. 3, 1959, Ser. No. 831,388
Claims priority, application Great Britain Aug. 28, 1958
3 Claims. (Cl. 85—5)

This invention relates to quick release fasteners of the kind commonly used for connecting sheets or other articles having registering apertures, comprising a radially apertured tubular member, a locking element(s) accommodated in the radial aperture(s) and an operating member formed with cam-like part(s) within the tubular member to move the locking elements into locking or released position. The fastener may be pushed through registering apertures in the articles to be fastened together, or be withdrawn from the articles when the cam groove on the operating member is in alignment with the radial apertures in the tubular member.

According to the invention such a quick release fastener comprises a radially apertured tube, at least one locking member movable in a radial aperture, an operating member which is deformed transversely of its body and is movable within the tube to cause the locking member to protrude outwardly from or to allow it to recede inwardly into the tube, and means introducing friction between the operating member and the tube.

According to another feature of the invention a quick release fastener of the kind referred to above is provided with a friction element restraining the movement of the operating member relative to the radially apertured tube.

Preferably said friction introducing means comprise a resilient member of which one end is immovable on the operating member and which bears frictionally against the inner surface of the tube; and, in addition said resilient member may be formed at its free end as a latch adapted to engage in a recess or hole formed in the tube to receive said latch at least when the operating member is in a locking position in the tube.

According to another feature of the invention a quick release fastener comprises a headed tube carrying at least one radially movable locking member and an operating member slideably mounted within said tube and being operable to move said locking member(s) into and out of the locking position, the operating member carrying a friction element engaging the inner surface of the tube and restraining the operating member against movement and holding it frictionally in the locking or release position.

According to a further feature of the invention the head of the tube, in which the operating member is movable axially, is formed with an internal annular groove into which the friction element expands in the manner of a latch when the operating member is moved into the locking position.

In accordance with another aspect of the invention a quick release fastener comprises a headed radially apertured tube and an operating member slideable therein for the actuation of radially movable locking members into the locking or release position, a friction element immovable on the operating member for engaging the inner surface of the tube and frictionally resisting the movement but yielding to an axial or rotational thrust on the operating member, a non-circular shaped knob at the free end of the operating member which knob is grooved circumferentially intermediate its length for co-operation with a correspondingly non-circularly apertured washer at the head end of the tube to hold the operating member in its locked position by rotation thereof.

Preferably one of the free ends of the friction introducing means is located in an axial recess on the operating member and the other end in either of four diametrically opposite recesses formed axially on the inner wall of the head of the tube.

Three embodiments of the invention will now be described by way of example with reference to the accompanying drawings in which:

FIG. 3 is a view in sectional elevation of the fastener in accordance with another embodiment of the invention showing the fastener in release position.

FIG. 4 is an end view of FIG. 3.

FIG. 5 is a view similar to that of FIG. 3 showing the fastener in locked position.

FIG. 6 is an end view of FIG. 5.

FIG. 7 is a cross section of FIG. 5 on the line A—A.

Figure 1:
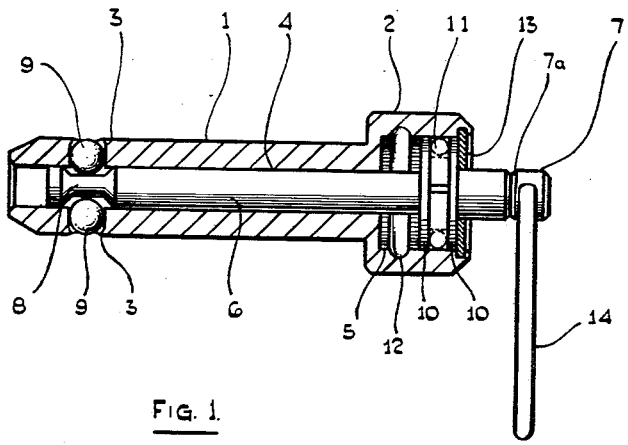
FIG. 1 is a view in sectional elevation of the invention showing the fastener in released position.
Figure 2:
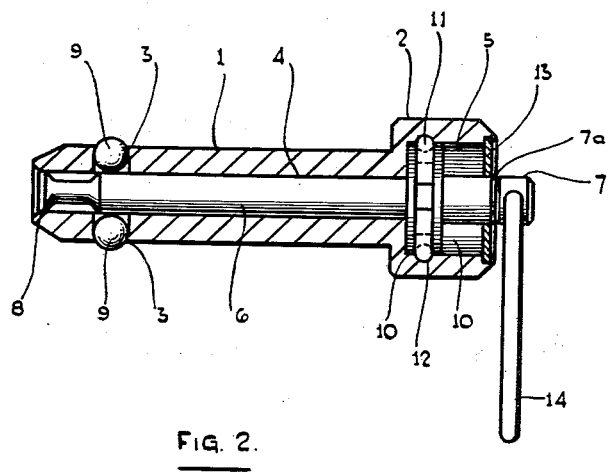
FIG. 2 is a view similar to that of FIG. 1 showing the fastener in locked position.

The fastener illustrated in FIGS. 1 and 2 of the drawing comprises a tubular member 1 having a head 2 of an enlarged diameter at its outer end and two radial passages 3 near its opposite end. The tubular member 1 is formed with a central bore 4 which is enlarged at 5 within the head 2. The bore 4 communicates with the radial passages 3. Housed within the bore 4 is an operating member in the form of a pin 6 slideably arranged therein. The operating member 6 has a head or knob 7 at its outer end and a cam groove 8 near its opposite end. The head 7 of the operating member 6 is formed intermediate its length with a circumferential groove 7a. The cam groove 8 co-operates with locking elements such as balls 9 which are movable in radial passages 3. When the cam groove 8 is in register with the radial passages 3 the balls 9 are allowed to recede within the tubular member 1, but on movement of the operating member 6 the cam groove 8 causes the balls to protrude outwardly from the external surface of the tubular member 1, from where the balls 9 cannot escape as the radial passages 3 have reduced diameter at the surface of the tubular member 1. The operating member 6 has an enlarged portion within the enlarged bore of head 2 and including two annular flanges 10 which are spaced from each other at a distance sufficient for accommodation of a friction element 11 between them. The friction element 11 is of annular or ringlike shape, the peripheral surface of which engages frictionally the inner surface of the enlarged head 2. The inner surface of the head 2 is formed with an annular groove 12. The location of this groove 12 within the head 2 is determined by the length of the stroke of the friction element 11 within the head 2 of the tubular member 1, which coincides with the movement of the operating member 6 from release into locking position. When the friction element 11 reaches the groove 12 at the end of its stroke it expands into the groove 12 (see FIG. 2). An apertured disc 13 is secured on the outer end of the head 2 preventing the withdrawal of the operating member 6 and of the friction element 11 carried thereby from the tubular member 1; the disc 13 serves also as a dust cover. A ring 14 is affixed to the knob 7 the purpose of which will become clearer as the description proceeds.

In use the fastener which is shown in FIG. 1 in released position is inserted into apertured articles (not shown) to be secured together, until the head 2 of the tubular member 1 abuts against the foremost article, which may be a plate or the like, the knob 7 of the operating member 6 together with the frictional element 11 is then pushed against the frictional resistance of the element 11 allowing this element to expand into the groove 12 when the operating member 11 is brought into the locking position thus providing lodgment against accidental unlocking of the operating member 6, (see FIG. 2). In this position the circumferential groove 7a on the plunger is flush with the disc 13 thus indicating to the operator that the fastener is in the locked position.

For releasing the operating member 6 a straight pull is applied to the ring 14 which causes the friction element 11 to disengage from the groove 12 and to move to the position shown in FIG. 1 in which the cam groove 8 on the operating member 6 is in register with the balls 9. The fastener may then be withdrawn.

In a modified construction of the fastener as shown in FIGS. 3-7 the knob 7 of the operating member 6 is formed with a circumferential groove 15 intermediate its length and with two diametrically opposed flats 16. The inner wall of the head 2 of the tubular member 1 has four axial recesses 17 and 18 spaced from each other at an angle of approximately 90°. A disc 19 formed with a non-circular aperture 20 is fixed at the head end of the tubular member 1, the aperture 20 of the disc 19 being of the same shape as the cross section of the knob 7. A looped end 21 of the friction element 11 engages one of the axial recesses 17 and 18 whilst the other end is formed with lateral projections 22 which extend into axially aligned slots 23 formed in the two flanges 10 of the operating member 6.

The fastener illustrated in FIGS. 3-7 works on a similar principal to the one previously described except that this embodiment of the invention has double lock features which make it vibration proof and, therefore, particularly desirable for use on aircraft. After pushing the knob 7 so that its groove 15 registers with the disc or washer 19 and the operating member 6 reaches its locking position, the knob 7 with the operating member 6 is rotated through an angle of 90° to a position in which the horizontal faces 24 of the knob 7 engage the disc 19 inside thereof and thus prevent the displacement of the operating member 6 from the locked position.

For releasing the fastener the knob 7 of the operating member 6 must be again rotated through an angle of 90° in either direction so that the cross sectional surface of the knob 7 is in register with the opening 20. A straight pull on the ring 14 sufficient to overcome the friction of the friction element 11 will shift the latter and the operating member 6 into release position in which the cam groove 15 will be in alignment with the radial apertures 3 thus allowing the balls 9 to recede. The provision of four axial slots 17 in the inner wall of the head 2 of the tubular member 1 is to facilitate the manipulation of the fastener. The two diametrically opposed slots 17-18 serve for location of the operating member in the fully locked position and the remaining two diametrically opposed slots 17-18 are to indicate that the flats 16 on the operating member are brought into alignment with the apertures 20 of the disc 19 when the operating member may be pulled to the unlocked position.

Another modification of the invention is shown in FIGS. 8-11. In this embodiment an operating member pin 25 is rotatably mounted in the tubular member 26 having an enlarged head 27 at its outer end and radial apertures 28 near its inner end. In each of the apertures 28 is located a ball 29 in such a manner that it cannot escape outwardly from the aperture 28. At its outer end the operating member 25 is formed with a knob 30 and at its opposite end it has two flats 31 equally spaced from the central axis of the spindle 25. Adjacent to the knob 30 the operating member 25 has two annular flanges 32 located within the enlarged bore of head 27, and between which is located an annular friction element 33. The friction element 33 is similar to that already described with reference to FIG. 7. Its free end 34 is looped and engages one of the four diametrically opposed axial recesses 35 formed in the inner surface of the head 27 of the tubular member 26. The other end of the friction grip 33 is formed with lateral projections extending into aligned slots 36 formed in the two flanges 32 of the operating member 25.

Figure 8:
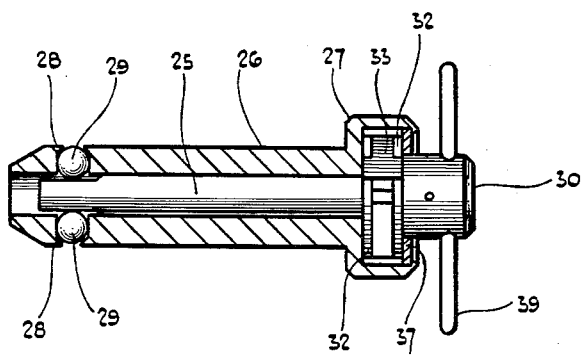
FIG. 8 is a view in sectional elevation of another modification of the invention showing the fastener in release position.
Figure 9:
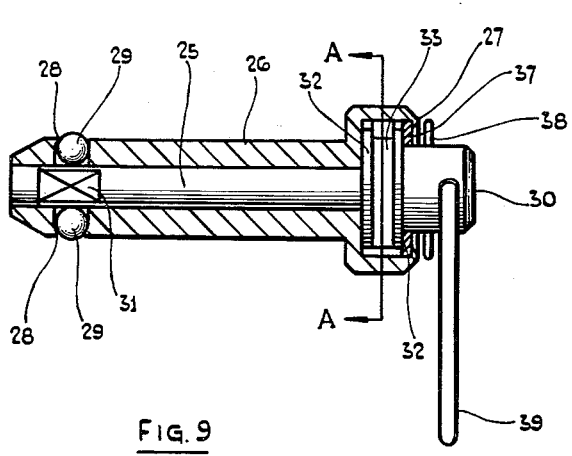
FIG. 9 is a view similar to that of FIG. 8 showing the fastener in locked position.
Figure 10:
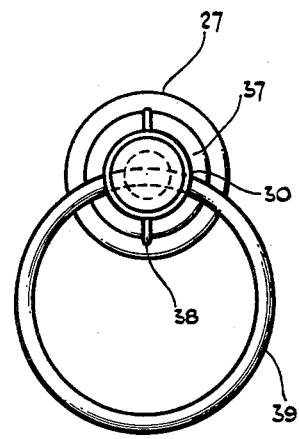
FIG. 10 is an end view of FIG. 9.
Figure 11:
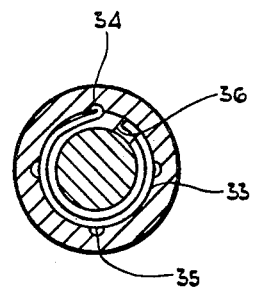
FIG. 11 is a cross sectional view of FIG. 9 on line A—A.

In use the knob 30 with its operating member 25 is set into release position as shown in FIG. 8 and then inserted into registering apertures in articles to be secured together (not shown) until the head 27 of the tubular member 26 bears against the foremost article to be secured. A rotational thrust is then applied to the knob 30 causing the operating member 25 and the friction element 33 to rotate through an angle of 90° against the frictional resistance of the latter into position shown in FIG. 9 in which the circular surfaces of the operating member 25 cause the locking balls 29 to protrude outwardly into the locking position. For releasing the fastener the knob 30 of the operating member 25 is again rotated through an angle of 90° against the frictional resistance of the friction element 33 until the flats 31 of the operating member 25 are brought into alignment with the locking balls 29 thus allowing them to recede within the tubular member 26.

The head 27 of the tubular member 26 is substantially shorter than the head 2 of the fastener shown in FIGS. 1-3, since the friction element 33 does not require to be displaced axially. The head 27 of the tubular member 26 may be appropriately marked with the words "release" and "lock" at the localities which will coincide with the location of the operating member 25 in its released or locked position. The cross pin 38 will indicate the respective positions of the operating member.

I claim:

1. A connecting device comprising: a tube having an enlarged head at one end thereof and at least one radial aperture spaced from said head, said head having an enlarged bore concentric with said tube and at least one axial recess formed in the inside annular surface of said bore, said recess extending throughout the depth of said bore; a cover piece closing the outer end of said bore and having a non-circular aperture formed at the center thereof; a locking member movable in said radial aperture; an operating member slidably and rotatably supported within said tube for movement between a locking position and a release position; cam means on said operating member operative to cause said locking member to protrude outwardly from said radial aperture upon movement of said operating member to said locking position within said tube, and to allow said locking member to recede inwardly into the tube upon movement of said operating member to said release position, said operating member having an intermediate portion extending through the bore of said head and a head portion passing through the aperture of said cover piece and projecting beyond said cover piece to form an operating knob by which said operating member may be moved between said locking position and said release position, said head portion of said operating member corresponding in cross-sectional configuration to the non-circular shape of the aperture in said cover piece and being grooved circumferentially to the smallest diameter of said non-circular aperture to permit turning of said operating member therein, the grooved portion being located to receive said cover piece when said locking member is in said locking position; and friction means for resisting movement of said operating member, said friction means comprising an outwardly biased, ring shaped, resilient member carried by and movable with said intermediate portion of said operating member, said resilient member having an outward projection on one end for engaging said axial recess in said enlarged bore to retain said operating member against rotation at least when it is in said locking position.

2. A connecting device as recited in claim 1 in which said enlarged bore is formed having four diametrically opposed axial recesses and in which said projection on said resilient member is engageable in either of said recesses to retain said operating member against rotation when in either of said locking or release positions.

3. A connecting device as recited in claim 1 in which said intermediate portion of said operating member has a pair of spaced radial flanges formed thereon and in which said resilient member is received between and secured to said flanges.

References Cited in the file of this patent

UNITED STATES PATENTS

| 1,427,313 | Morse | Aug. 29, 1922 |
| 1,920,511 | Kulicke et al. | Aug. 1, 1933 |
| 1,991,574 | Rabezzana | Feb. 19, 1935 |
| 2,402,925 | Spooner | June 25, 1946 |
| 2,730,154 | Aspey | Jan. 10, 1956 |
| 2,816,471 | Bachman | Dec. 17, 1957 |

UNITED STATES PATENT OFFICE
CERTIFICATE OF CORRECTION

Patent No. 3,068,737                  December 18, 1962

Charles Mewse

It is hereby certified that error appears in the above numbered patent requiring correction and that the said Letters Patent should read as corrected below.

In the heading to the printed specification, line 9, for "Aug. 28, 1958" read -- Aug. 8, 1958 --.

Signed and sealed this 1st day of October 1963.

(SEAL)
Attest:

ERNEST W. SWIDER                  DAVID L. LADD

Attesting Officer                  Commissioner of Patents